United States Patent
Fatica et al.

(10) Patent No.: US 10,370,904 B2
(45) Date of Patent: Aug. 6, 2019

(54) FACILITY COMPRISING AT LEAST TWO BOTTOM-SURFACE LINKS COMPRISING VERTICAL RISERS CONNECTED BY BARS

(71) Applicant: SAIPEM S.A., Montigny le Bretonneux (FR)

(72) Inventors: Giulio Fatica, Milan (IT); Gianmarco Rota, Mozzo (IT); Roberto Palladini, Milan (IT)

(73) Assignee: Saipem S.A., Montigny Le Bretonneux (FR)

( * ) Notice: Subject to any disclaimer, the term of this patent is extended or adjusted under 35 U.S.C. 154(b) by 0 days.

(21) Appl. No.: 15/555,296

(22) PCT Filed: Mar. 3, 2016

(86) PCT No.: PCT/FR2016/050492
§ 371 (c)(1),
(2) Date: Sep. 1, 2017

(87) PCT Pub. No.: WO2016/142607
PCT Pub. Date: Sep. 15, 2016

(65) Prior Publication Data
US 2018/0038168 A1     Feb. 8, 2018

(30) Foreign Application Priority Data
Mar. 6, 2015    (FR) ..................... 15 51898

(51) Int. Cl.
*E21B 17/01*    (2006.01)
*E21B 19/00*    (2006.01)
(Continued)

(52) U.S. Cl.
CPC .......... *E21B 17/012* (2013.01); *E21B 19/002* (2013.01); *E21B 43/01* (2013.01);
(Continued)

(58) Field of Classification Search
CPC ..................................................... E21B 17/012
See application file for complete search history.

(56) References Cited

U.S. PATENT DOCUMENTS 4,762,180 A  *  8/1988  Wybro .................... E21B 7/128
                                                        166/350
6,524,152 B1 *  2/2003  Dauphin ............... E21B 17/012
                                                        166/367
(Continued)

FOREIGN PATENT DOCUMENTS

WO    WO 00/49267    8/2000
WO    WO 02/066786   8/2002
(Continued)

*Primary Examiner* — Matthew R Buck
*Assistant Examiner* — Aaron L Lembo
(74) *Attorney, Agent, or Firm* — Cozen O'Connor (57) ABSTRACT

An installation of bottom-to-surface connections of at least two undersea pipes (11-1, 11-2) resting on the sea bottom (10), and a rigid pipe (1-1, 1-2) constituted by a vertical riser having its bottom end (1a) fastened to a base (9-1, 9-2) at the sea bottom (10), and having its top end (1b) tensioned by an immersed float (4-1, 4-2); and a flexible connection pipe (2-1, 2-2) providing the connection between a common floating support (12) and the top end (1b) of the vertical riser via a junction device (3-1, 3-2; wherein two hybrid towers are connected together by at least one rigid separator bar (5) having a length not less than the diameter of the larger-diameter float.

15 Claims, 7 Drawing Sheets

(51) Int. Cl.
*E21B 43/01* (2006.01)
*F16L 1/15* (2006.01)
*F16L 1/26* (2006.01)
*E02B 17/00* (2006.01)
*F16L 1/24* (2006.01)

(52) U.S. Cl.
CPC .................. *F16L 1/15* (2013.01); *F16L 1/26* (2013.01); *E02B 2017/0095* (2013.01); *F16L 1/24* (2013.01)

(56) References Cited

U.S. PATENT DOCUMENTS

| | | | | |
|---|---|---|---|---|
| 6,712,559 | B2* | 3/2004 | Lenormand | E21B 17/012 166/350 |
| 7,404,695 | B2* | 7/2008 | Chenin | E21B 17/015 405/224.3 |
| 7,591,316 | B2* | 9/2009 | Hatton | E21B 17/015 166/350 |
| 8,555,982 | B2* | 10/2013 | Luppi | E21B 17/012 166/341 |
| 9,115,543 | B2* | 8/2015 | Pionetti | E21B 17/012 |
| 9,702,109 | B2* | 7/2017 | Pionetti | E21B 41/08 |
| 2004/0129425 | A1 | 7/2004 | Wilson | |
| 2004/0218981 | A1* | 11/2004 | Chenin | E21B 17/015 405/169 |
| 2011/0147003 | A1* | 6/2011 | Luppi | E21B 17/012 166/367 |
| 2012/0292039 | A1* | 11/2012 | Saint-Marcoux | E21B 17/012 166/345 |
| 2012/0292040 | A1* | 11/2012 | Prescott | E21B 17/01 166/345 |
| 2012/0298373 | A1* | 11/2012 | Luppi | B63B 21/507 166/350 |
| 2013/0299179 | A1* | 11/2013 | Joensen | E21B 17/012 166/367 |
| 2014/0314493 | A1* | 10/2014 | Luppi | E21B 17/012 405/224 |
| 2015/0000925 | A1* | 1/2015 | Benard | E21B 17/01 166/359 |
| 2015/0047852 | A1* | 2/2015 | Pionetti | E21B 17/012 166/350 |
| 2015/0247366 | A1* | 9/2015 | Karunakaran | B63B 22/023 441/23 |
| 2016/0168921 | A1* | 6/2016 | Tan | E21B 17/015 166/350 |

FOREIGN PATENT DOCUMENTS

| | | |
|---|---|---|
| WO | WO 02/103153 | 12/2002 |
| WO | WO 2007/023233 | 3/2007 |
| WO | WO 2008/152505 | 12/2008 |
| WO | WO 2009/138610 | 11/2009 |
| WO | WO 2011/050064 | 4/2011 |

* cited by examiner

FACILITY COMPRISING AT LEAST TWO BOTTOM-SURFACE LINKS COMPRISING VERTICAL RISERS CONNECTED BY BARS

PRIORITY CLAIM

This is a U.S. national stage of application No. PCT/FR2016/050492, filed on Mar. 3, 2016. Priority is claimed on France Application No. FR1551898, filed Mar. 6, 2015, the content of which is incorporated here by reference.

BACKGROUND OF THE INVENTION

1. Field of the Invention

The present invention relates to an installation of multiple bottom-to-surface connections having at least two undersea pipes resting on the sea bottom, in particular installed at great depth, and comprising at least one hybrid tower.

The technical sector of the invention is more particularly the field of fabricating and installing production risers for undersea extraction of oil, gas, or other soluble or meltable material or a suspension of mineral material from an underwater well head to a floating support in order to develop production fields that are installed offshore, in the open sea. The main and immediate application of the invention lies in the field of oil production.

2. Description of the Prior Art

A floating support generally includes anchor means so as to enable the support to remain in position in spite of the effects of currents, wind, and swell. The support also generally has means for storing and processing oil together with means for offloading to offloading tankers that call at regular intervals in order to remove the production. Such floating supports are commonly referred to as floating production storage offloading supports and the initials FPSO are used throughout the description below.

Bottom-to-surface connections are known comprising an undersea pipe resting on the sea bottom, the connections being of the type known as a "hybrid tower" and comprising:
 a vertical riser having its bottom end anchored to the sea bottom and connected to a said pipe resting on the sea bottom, and its top end tensioned by a float immersed in the subsurface and to which it is connected; and
 a connection pipe, generally a flexible connection pipe between the top end of said riser and a floating support on the surface, said flexible connection pipe, where appropriate, taking up the shape of a dipping catenary curve under its own weight, i.e. it goes well below the float prior to subsequently rising up to said floating support.

Bottom-to-surface connections are also known that are made by continuously raising strong and rigid pipes up to the subsurface, which pipes are made up of thick steel tubular elements that are welded or screwed together, taking up a catenary configuration of continuously varying curvature all along their suspended length, commonly referred to as steel catenary risers (SCRs). Such a catenary pipe may rise as far as the floating support on the surface or no further than a float in the subsurface that serves to tension its top end, which top end is then connected to a floating support by a dipping flexible connection pipe.

It is desired to make use of as many bottom-to-surface connections as possible from any one floating support in order to optimize the working of oil fields. That is why various systems have been proposed that are suitable for associating a plurality of vertical risers together in order to reduce the space occupied in the working field and in order to be able to have as large as possible a number of bottom-to-surface connections connected to a single floating support. Typically, it is necessary to be able to install up to 30 or indeed 40 bottom-to-surface connections from a single floating support.

Document WO 00/49267 describes a multiple hybrid tower comprising an anchor system with a vertical tension leg constituted either by a cable or by a metal bar or indeed by a pipe that is tensioned at its top end by a float. The bottom end of the tension leg is fastened to a base resting on the bottom. Said tension leg includes guide means distributed all along its length and through which there pass a plurality of said vertical risers, said base may be merely placed on the sea bottom where it remains in position under its own weight, or it may be anchored by means of piles or any other device suitable for holding it in place. In WO 00/49267, the bottom end of the vertical riser is suitable for being connected to the end of a sleeve with a bend that is movable between a top position and a bottom position, relative to said base, from which said sleeve is suspended and associated with return means returning it to its top position when there is no riser. The ability of the sleeve with a bend to move makes it possible to absorb variations in the length of the riser under the effects of temperature and pressure. At the head of the vertical riser, an abutment device secured thereto bears against the support guide installed at the head of the float, thereby holding the entire riser in suspension.

That embodiment comprising a multitude of vertical risers held by a central structure including guide means is relatively expensive and complex to install. Furthermore, the installation needs to be prefabricated on land prior to being towed out to sea, and then once on site, it needs to be up-ended in order to be put into place. In addition, its maintenance also requires relatively high operating costs.

In WO 02/066786 and WO 02/103153, in the name of the Applicant, multiple-riser hybrid towers are described having vertical riser anchor systems suitable for receiving two risers side by side from a common anchoring base, with the floats at the heads of said risers being secured and fastened to each other by means of a hinged structure in the form of a parallelogram. The two risers are also connected together by tubular collars fastened on one of the risers and connected by means of rings that slide freely around the second riser, such that both risers can follow substantially the same lateral movements while being relatively more independent in their vertical movements.

Specifically, when it is desired to associate a plurality of vertical risers with a single floating support, the problem arises of interference between the movements of said risers, which are subjected to the same movements as their header tensioning floats under the effect of the movements of the floating support at the surface where it is subjected to swell, wind, and currents.

The above-described embodiments are relatively effective, but still rather too complicated concerning the method for putting them into place and maintenance constraints while they are in operation, in particular concerning the anchoring system and also how the risers are associated with one another. Furthermore, and above all, that type of multiple-riser hybrid tower needs to be prefabricated on land prior to being installed at sea.

When a multiplicity of bottom-to-surface connections of the hybrid tower type are used, each comprising a vertical riser, it is necessary in practice to space the various pipes further apart from one another than for SCR type catenary risers since the floats at the tops of the risers are subjected to movements in a cone having its apex situated at the anchor system, with an angle at the apex that requires sufficient distance to be provided between the various floats at the heads of the vertical risers in order to avoid them bumping into one another.

These constraints involve spreading out the working zone and thus limiting the number of bottom-to-surface connections that can be connected to a single floating support over its sides in order to avoid interference between the various connections.

Furthermore, since the crude oil travels over distances that are very long, several kilometers, it is necessary to provide such connections with extremely expensive insulation firstly to minimize the increase in viscosity that would lead to a reduction in the hourly production from wells, and secondly to avoid the flow being blocked by deposition of paraffin, or by formation of hydrates once the temperature drops to around 30° C.-40° C. These latter phenomena are particularly critical in West Africa since the temperature at the sea bottom is of the order of 4° C. and the crude oil is of the paraffinic type. It is therefore desirable for the bottom-to-surface connections to be short in length and thus for the space occupied by the various connections going to a common floating support to be limited.

That is why it is desired to provide an installation suitable for use from a single floating support with a plurality of bottom-to-surface connections of the hybrid tower type with vertical risers that are compact and move little, and that are also simple to lay and can be fabricated at sea from a pipe laying vessel, so as to avoid prefabrication on land followed by towing to the site and up-ending in order to finally put the installation into place.

In published application US 2004/0129425, proposals are made to use a single float having connected thereto a plurality of vertical risers that are anchored to the sea bottom. However the system proposed in that patent presents several drawbacks:

firstly, for reasons involved with putting the installation into place, the float needs to present variable buoyancy characteristics so as to be capable of increasing its buoyancy progressively as the various pipes of SCR riser type plus the flexible pipe are attached sequentially thereto; and secondly, attaching the top of a second vertical riser and/or of an SCR pipe to the float that is already at the top of a first vertical riser leads to practical problems that are not solved nor even mentioned in that publication of a US patent application.

Furthermore, differential expansions between two of said risers, one being cold and the other hot, can be as much as several meters for water depths of 1500 meters (m), making it practically impossible to put two said risers into parallel unless special arrangements are provided either at the top ends or at the bottom ends of said risers.

Finally, another drawback in the system proposed in that patent application US 2004/0129425 is that the float needs to be dimensioned initially as a function of some determined maximum buoyancy that is suitable for tensioning some predetermined number of pipes. Unfortunately, in practice, it is desirable to be able to install the various bottom-to-surface connections in a manner that is spread out over time without it being possible during initial installation of the system to have predetermined ideas concerning the final number of connections, since as a general rule that number is not known in certain and accurate manner when starting out.

In Document WO 2007/023233, a bottom-to-surface connection installation is described having at least two undersea pipes resting on the sea bottom, in particular at great depth, and comprising:

1) a first hybrid tower comprising:
   a) a rigid pipe consisting in a vertical riser having its bottom end fastened to a first base anchored to the sea bottom and connected to a first said undersea pipe resting on the sea bottom, and having its top end tensioned in substantially vertical manner by a first float immersed in the subsurface, preferably at a depth of at least 50 m, to which the rigid pipe is connected; and
   b) a first connection pipe, preferably a flexible pipe, providing the connection between a floating support and the top end of said vertical riser; and 2) at least one second rigid pipe rising from the bottom of the sea on which it rests, or from a second undersea pipe resting on the bottom of the sea to which its bottom end is connected, up to the subsurface where its top end is connected to at least one respective second connection pipe, which is preferably flexible, providing its connection with the same said floating support.

The installation of WO 2007/023233 is characterized in that the top end(s) of the said second rigid pipe(s) is/are connected to respective second float(s) situated at substantially the same depth as said first float and rigidly fastened to said first float, preferably float against float.

The term "rigidly fastened" is used herein to mean that two floats are secured to each other concerning their movements by a rigid connection and in particular that any degree of freedom of one float to move relative to the other in rotation or in translation is eliminated, like a connection where one part is embedded in another.

The term "vertical riser" is used herein to refer to the substantially vertical theoretical position of the riser when it is at rest, it being understood that the axis of the riser can be subjected to angular movements relative to the vertical and can move within a cone of angle α having its apex corresponding to the point where the bottom end of the riser is fastened to said base.

That system of positioning and co-operation between two rigid pipes, one of which is constituted by a vertical riser and the other by an SCR type riser, each having its own float at the top and independent anchoring makes it possible to bring the floats close together without running the risk of two floats banging against each other as a result of their respective movements, and also makes it possible to fabricate the entire installation at sea from a pipe laying vessel while simplifying the laying of the respective pipes in the sea, and also gives them stability in operation because their floats are fastened together, so that the top ends and the floats move identically.

In WO 2007/023233, provision is also made for two sets of two rigid pipes, each constituted by a vertical riser together with an SCR type riser connected together by bars fastened rigidly to their floats, are themselves connected together by a flexible connection in order to limit possible spacing between the sets.

That embodiment cannot be applied when multiple side-by-side vertical risers are subjected to head movements that are greater both vertically and angularly, giving rise to excessive coupling forces that need to be taken up by the rigid fastenings between floats, and in particular including large bending moments that need to be taken up by the floats. Unfortunately, floats are fragile members and it is necessary to avoid requiring them to take up excessive forces.

There can also be vertical forces for taking up that are too great at the rigid connection between two floats in the event of large differential movements between two risers and two floats in the event of movement under the effect of the floating support moving and/or under the effect of swell, wind, and currents, or under the effect of differential expansions of the two risers conveying hot fluids. In particular when the vertical risers are subjected to differential longitudinal expansions because they are conveying fluids at different temperatures.

When the pipes are coaxial pipe-in-pipe (PIP) pipes, the problem of differential expansion is made worse. In PIPs, the effects of action between the two coaxial pipes resulting from the fact that the two pipes are mutually embedded can lead to multiplying forces on the assembly by two.

Conversely, in WO 2007/023233, the flexible connection connecting together two sets of two rigid pipes, each constituted by a vertical riser and an SCR type riser connected together by bars fastened rigidly to their floats, does not prevent the two sets of floats moving towards each other and thus running the risk of banging together.

The problem posed in the present invention is thus to provide an installation with a multiplicity of bottom-to-surface connections running from a common floating support, in which the methods of laying and putting the installation into place make it possible simultaneously:

to reduce the installed distance between the various bottom-to-surface connections, i.e. to enable a plurality of vertical risers of bottom-to-surface connections to be installed in a space that is as small as possible, or in other words with a reduced footprint, specifically, amongst other purposes, in order to increase the number of bottom-to-surface connections that can be installed along the side of an FPSO, without said bottom-to-surface connections interfering with one another, and to do so without risk of floats or pipes banging together under the effect of movements of the floating support and/or of swell, of wind, and of currents; and to perform fabrication and installation easily by sequentially fabricating and laying the various pipes from a laying vessel on the surface fitted with a J-lay tower, and finally to optimize the use of buoyancy means when installation is spread out over a long period of time between putting the various bottom-to-surface connections into place, and for this to be possible without needing to know from the beginning how many connections are going to be laid, nor their characteristics in terms of dimensions, and unit weights.

During the stage of planning the development of an oil field, the oil reservoir is known incompletely at that stage, and full-rate production often makes it necessary, after a few years, to reconsider the initial production schemes and the organization of the associated equipment. Thus, during initial installation of the system, the number of bottom-to-surface connections and the way they are organized is defined with reference to estimated needs, with said needs almost always being revised upwards after the field has been put into production, either in order to recover crude oil, or else because of the need to inject more water into the reservoir, or indeed in order to recover or reinject more gas. As the reservoir becomes depleted, it is generally necessary to drill new wells for injecting water or gas, or to drill production wells at new locations in the field, so as to increase the overall recovery rate, thereby correspondingly complicating all of the bottom-to-surface connections connected to the side of the FPSO.

Another problem invention is to be able to make and install such bottom-to-surface connections for undersea pipes at great depths, such as at depths of more than 1000 m, for example, and of the type comprising a vertical hybrid tower conveying a fluid that needs to be maintained above some minimum temperature until it reaches the surface, while minimizing the number of components that are subjected to heat losses, and avoiding the drawbacks created by proper or differential thermal expansion of the various components of said tower so as to be able to withstand the extreme stresses and the fatigue phenomena that accumulate over the lifetime of the work, which may commonly exceed 20 years.

Another problem is also to provide an installation of multiple bottom-to-surface connections with hybrid towers of great strength and at low cost, and in which the methods for fabricating and putting into place the various component elements are simplified and also of low cost, and can be performed at sea from a laying vessel.

SUMMARY OF THE INVENTION

The present invention provides an installation of bottom-to-surface connections for at least two undersea pipes resting on the sea bottom, in particular at great depth, in particular at a depth of more than 500 m, the installation comprising at least two hybrid towers, each comprising:

a) a rigid pipe constituting a vertical riser having its bottom end fastened to a base resting on or anchored to the sea bottom, each rigid pipe being connected to a respective undersea pipe resting on the sea bottom, and having the top end of the riser tensioned in substantially vertical manner by a float immersed in the subsurface, preferably at a depth of at least 50 m relative to the surface, the top end being connected to the float; and b) a flexible connection pipe providing the connection between a floating support and the top end of said vertical riser via a junction device, preferably of the goose-neck type, arranged at the top end of said vertical riser;

the installation being characterized in that said two hybrid towers are connected together by at least one rigid separator bar of length not less than the diameter of the larger-diameter float, preferably a length of at least 10 m and not more than 50 m, preferably in the range 20 m to 35 m, the longitudinal ends of each said separator bar being fastened to the top ends of said risers or to said two floats by fastener devices allowing at least a first movement in rotation of said bar relative to an axis (YY') perpendicular to the longitudinal axis (XX') of said separator bar and perpendicular to the axis (ZZ') of said float or of said top end of the riser to which it is fastened.

Preferably, the fastener device is a rotary fastener and hinge device having at least one degree of freedom to move in rotation so as to allow at least said first movement in rotation.

More preferably, in order to reduce the forces on the structures, the fastener and hinge device has two degrees of freedom to move in rotation allowing:

a) said separator bar to perform said first movement in rotation; and b) said separator bar to perform a second movement in rotation relative to the longitudinal axis (ZZ') of said float or of said riser end to which it is fastened.

This installation makes it possible to conserve sufficient distance between the tops of the risers and/or between the header floats in order to prevent them bumping into each other as a result of the movements to which they are subjected as a result movements of the sea and/or movements of the floating support. Said first movement in rotation of the hinge fastening of said separator bar provides freedom to perform differential vertical movements between the tops of the two risers and/or between the header floats, and/or angular movements relative to the vertical.

Because of the length of the separator bars, and thus also for them to take up relative angles of inclination that suffice in practice, it is possible for the risers and their floats to be subjected to vertical movements and/or differential longitudinal elongations that suffice in practice.

Because the two risers and the two floats are located in the same zone, they are subjected to pendular or angular movements that tend to remain substantially parallel, such that said separator bar is not subjected to twisting forces, and it appears to be unnecessary to make use of a third degree of freedom to move in rotation relative to its longitudinal axis.

In contrast, said second movement in rotation that is possible for said separator bar relative to the longitudinal axis (ZZ') of said float or of said riser end to which it is fastened appears to be particularly advantageous in that it allows the tensioning floats or the riser tops to move in rotation about their own longitudinal axes, which is essential because of the high tension between the tensioning floats and the riser tops, which can lead to them being subjected to turning movements of this type.

This second degree of freedom to move in rotation thus makes it possible to avoid repeated bending forces being taken up by said hinge fastener device.

Thus, the installation of the present invention presents small size and moves little, and it also presents stability that is increased compared with bottom-to-surface connections having in association two vertical riser type pipes (a standing hybrid riser (SHR)) as described in the prior art, for which the safe spacing between two vertical risers in that type of configuration of hybrid towers needs to be about 50 m.

This system for arrangement and co-operation between two rigid pipes serves to confer stability in operation, with identical movements of the top ends on their own and of the floats also contributing to stabilizing the movements at the head(s) of the riser(s). The relative stability and the reduced movements of such hybrid towers makes it possible to install said assemblies relatively close together, by allowing the floats or the tops of the risers to be closer together without any risk of two floats bumping together in their respective movements.

The length of the separator bars of the invention makes it possible to divide the distance between risers by a factor of 2 to 4 compared with the usual distances in the prior art, while maintaining sufficient distance to avoid interference and impacts between the dipping portions of said pipes, and in particular of the flexible pipes.

This system of arrangement and co-operation between two rigid pipes also makes it possible to fabricate the entire installation at sea from a pipe-laying vessel, and to simplify laying the respective pipes at sea.

More particularly, said rotary fastener and hinge device comprises:
  a clevis rigidly fastened to one end of said separator bar, which clevis supports a transverse cylindrical rod forming the axis (YY') for said first movement in rotation arranged perpendicularly to the longitudinal axis (XX') of said separator bar and perpendicularly to the axis (ZZ') of said float or of said riser top end to which said separator bar is fastened; and
  a longitudinal element in the form of a finger having its top end with said transverse cylindrical rod passing therethrough forming the axis for said first movement in rotation and about which said finger is mounted so as to be free to move in rotation; and
  a sleeve forming a sheath having a cylindrical orifice adapted to receive said finger and allowing said finger to move in rotation about its longitudinal axis coinciding with the longitudinal axis of said cylindrical orifice in the sleeve arranged parallel to the axis (ZZ') of said float or of said riser top end to which said sleeve is fastened, said sleeve including removable retaining means suitable for retaining said finger in said cylindrical orifice of said sleeve.

The term "removable" is used herein to mean that said retaining means can be actuated to retain or deactuated at will, in particular by using a remotely operated vehicle (ROV) and/or merely by applying thrust on resilient means supporting it, so as to enable said finger to be inserted or extracted.

More particularly, said floats or said top ends of said vertical risers are connected together by a plurality of rigid separator bars of the same length arranged in parallel, preferably by two to ten bars, more preferably by two or three bars.

Preferably, said separator bar is a hollow rod perforated in its longitudinal direction over its entire length opening out at its longitudinal ends, and also including transverse perforations allowing water to pass in a direction perpendicular to its longitudinal direction.

This characteristic makes it possible to avoid dimensioning the bar so as to be capable of withstanding collapse under the effect of external hydrostatic pressure. The small transverse perforations seek to allow the inside of the bar to be filled with water more quickly.

In a first variant embodiment of the bottom-to-surface connection installation of the invention, said longitudinal ends (5a) of said separator bar are fastened to the cylindrical outside walls of said first and second floats respectively.

In a second variant embodiment of the installation, the longitudinal ends of said separator bar are fastened to an assembly structure supporting a junction device, preferably of the goose-neck type, arranged at the top end of said vertical riser and providing its junction with a said flexible pipe, said assembly structure being constituted by a latticework of beams.

This embodiment is advantageous in that said assembly and support structure constituted by beams arranged in a latticework serves to take up the forces associated with tension or compression exerted by said rigid pipes or said floats on the junction device and to avoid transferring those forces in full to said junction device. It should be recalled that the tension exerted by said floats for a vertical riser pipe extending over more than 1000 m is at least 500 metric tonnes (t) and preferably at least 1000 t. In addition, fastening to said assembly structure makes it possible to avoid exerting forces on said floats, which are voluminous hollow drums of cylindrical structure that are relatively more fragile. The size of these drums generally lies in the range 20 m to 50 m for a diameter of 4 m to 8 m.

It can be understood that both ends of said bar are fastened to facing outside wall portions of each of the two floats or to facing portions of said assembly structures that are the closest together.

Advantageously, the use of said separator bars fastened in hinged manner to said floats is combined with the use of other said separator bars fastened in hinged manner to said assembly structures.

More particularly, said floats and/or said the top ends of said vertical risers are substantially at the same height above the sea bottom and are connected together by at least two rigid separator bars of the same length arranged in parallel and perpendicularly to the axes of said floats and/or of the top ends of said risers, said two separator bars preferably being spaced apart by a height of at least one-fifth of the height of said floats and/or of an assembly structure via which said top ends of said vertical risers supporting said junction devices.

Thus, when the risers are at rest in the vertical position, said bars are in a horizontal position.

In practice, the height of said floats and of said assembly structures lies in the range 20 m to 50 m.

More particularly, the bottom-to-surface connection installation of the invention further comprises more than two hybrid towers and thus more than two said vertical risers, and in particular 2 to 50 risers, preferably 2 to 10 risers, still more preferably 2 to 5 risers, the top ends or the floats of each of the vertical risers of each tower being connected to at least two other riser top ends or two other floats that are the closest thereto, the flexible pipes being connected to a common floating support.

More particularly, at least one of said hybrid towers has a rigid pipe in the form of two coaxial pipes of the pipe-in-pipe type.

More particularly, each hybrid tower comprises a connection device between a said float and the top end of said riser and comprising:
  a flexible pipe portion having its ends embedded respectively in the underface of said float and the top end of said vertical riser; and
  the connection of said flexible pipe portion to the top end of said riser taking place via a goose-neck shaped device, which goose-neck shaped device also provides the connection of said riser and of a said flexible connection pipe with the floating support, preferably a said flexible pipe; and
  said flexible pipe portion preferably being extended through said float by a rigid tubular pipe portion passing right through the float so that it is possible to take action inside said vertical riser from the top portion of said float through said rigid tubular pipe portion, then through said goose-neck shaped device, so as to access the inside of said riser and clean it by injecting liquid and/or by scraping the inside wall of said riser, and then access said undersea pipe resting on the sea bottom.

More particularly, the connection between the bottom end of said vertical riser and a said undersea pipe resting on the sea bottom takes place via a flexible joint hinge that allows said main portion of the riser to perform angular movements (a) relative to said terminal pipe portion.

Still more particularly, said riser includes at its bottom end a flexible terminal pipe portion, preferably a reinforced pipe portion, that is connected to the main portion of the riser by a said flexible joint hinge that allows said angular movements of the main portion of the riser relative to said terminal pipe portion, and said base rigidly holding said terminal pipe portion of said vertical riser in a fixed vertical position by means of a structure that is secured to said base.

Connections between the bottom end of the riser and a base by means of a flexible hinge of this type are described in particular in WO 02/103153 and in WO 02/066786.

More particularly, the terminal portion of said pipe resting on the sea bottom presents terminal curvature in the form of a bend, and preferably with a large radius of curvature; and the bottom end of said terminal portion of the vertical riser is connected to the top end of said terminal curvature of the undersea pipe resting on the bottom via a single connection element between said vertical riser and said undersea pipe resting on the bottom, preferably an automatic connector; said base holds the following rigidly in a stationary vertical position and connected together by means of said connection element:
  firstly said terminal pipe portion of said vertical riser; and
  secondly said terminal curvature in the form of a bend of said undersea pipe resting on the bottom, the end being turned to face upwards.

More particularly, the connection between the bottom end of said first or second vertical riser and a said first or second respective undersea pipe resting on the sea bottom takes place via an anchor system comprising a base resting on and/or anchored to the sea bottom (10), and said vertical riser includes at its bottom end a terminal pipe portion, which is preferably reinforced, connected to the main portion of said vertical riser, and said base holds said terminal pipe portion of said vertical riser in a stationary vertical position, which terminal portion is rigidly embedded in said base.

Connections of this type between the bottom end of a riser and a base with rigid embedding are described in particular in WO 2009/138610.

The bases of the various vertical risers may be a single common base or they may be distinct bases, in particular of the type comprising suction anchors pressed into the sea bottom.

The present invention also provides a method of laying at sea an installation of the invention, the method being characterized in that it comprises the following steps:

1) assembling from a laying vessel on the surface a first vertical riser that is lowered and anchored to the sea bottom at a first base and that is tensioned at its head by a first float immersed in the subsurface, and connecting the bottom end of said riser to the end of a said first undersea pipe resting on the sea bottom; and 2) assembling from the laying vessel on the surface a second rigid pipe that is tensioned at its head by a second float immersed in the subsurface, and connecting the bottom end of said second riser to the end of a said second undersea pipe resting on the sea bottom; and 3) connecting together said first and second floats or the tops of said first and second risers by means of said separator bars lowered by cables from the laying vessel and fastening the longitudinal ends of said separator bars by means of said fastener and hinge devices by using a remotely operated vehicle, to said floats and/or said assembly structures supporting said junction devices at the top ends of said risers; and 4) laying first and second flexible connection pipes between said first and second rigid pipes and a common floating support.

The present invention makes it possible to perform a method of working an oil filed using at least one installation of the invention, in which fluids comprising oil are transferred between a floating support and undersea pipes resting on the sea bottom.

Said connection pipes between the floating support and the top end of the vertical riser may be:
- a flexible pipe or a pipe of reduced stiffness if the header float is close to the surface; or
- a thick steel pipe, i.e. a rigid pipe, if the header float is at great depth.

In known manner, such flexible connection pipes adopt a dipping curve in the form of two catenaries for connecting the flexible pipes to said rigid pipe or riser, and goose-neck type devices known to the person skilled in the art are interposed, where an improved embodiment of such a device is described in FR 2 809 136, in the name of the Applicant.

In known manner, in order to connect together the various pipes, use is made of connection elements, in particular of the automatic connector type, which involves locking between a male portion and a complementary female portion, the locking being designed to take place very simply at the sea bottom by using a remotely operated vehicle (ROV) without requiring any direct manual intervention by divers.

BRIEF DESCRIPTION OF THE DRAWINGS

Other characteristics and advantages of the present invention appear in the light of the following detailed description of various embodiments, given with reference to the following FIGS. 1 to 5.

DETAILED DESCRIPTION OF THE PRESENTLY PREFERRED EMBODIMENTS

Figure 1:
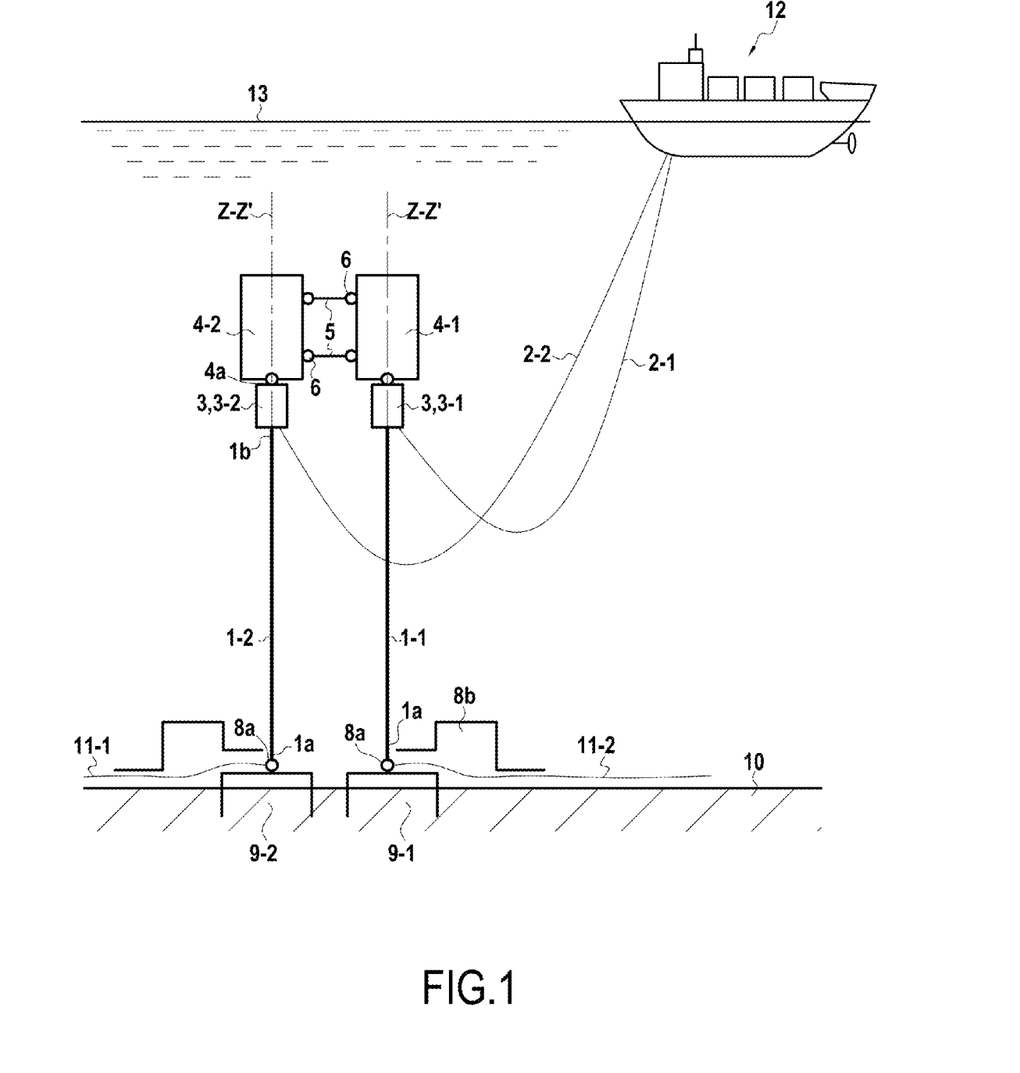
FIG. 1 is a diagrammatic view of an installation of the present invention showing two riser towers connected together by two separator bars between their header floats.

FIG. 1 shows an installation of the present invention comprising two hybrid towers providing the connection between a single floating support 12 and two undersea pipes 11-1, 11-2 resting on the sea bottom 10.

A first hybrid tower comprises:
a1) a first rigid pipe 1-1 consisting in a first vertical riser having its bottom end 1a fastened to a flexible hinge 8a, itself secured to a first base 9-1 anchored to the sea bottom 10 and connected to a first undersea pipe 11-1 resting on the sea bottom, and having the top end 1b of the riser tensioned in a substantially vertical direction by a first float 4-1 to which it is connected, the float being immersed in the subsurface, preferably at a depth of at least 100 m relative to the surface 13; and b1) a first flexible connection pipe 2-1 providing the connection between a floating support 12 and the top end 1d of said first vertical riser via a first junction device 3-1 of the goose-neck type that is arranged at the top end 1-b of said first vertical riser; and 2) at least one second hybrid tower comprising:
a2) a second rigid pipe 1-2, 1-3 consisting in a second vertical riser having its bottom end fastened to a base 9-2 anchored to the sea bottom (10) and connected to a second undersea pipe 11-2 resting on the sea bottom, and having its top end tensioned substantially vertically by a second float 4-2 that is immersed in the subsurface at a depth of at least 50 m, to which the pipe is connected; and b2) a second flexible connection pipe providing the connection between the same said floating support 12 and the top end of said second vertical riser via a second junction device 3-2, 3-3, preferably of the goose-neck type, arranged at the top end 1b of said second vertical riser.

Said first and second vertical risers are connected together by two rigid separator bars 5 having a length that is at least equal to the diameter of the larger-diameter float, and preferably of length that is not less than three times the diameter of the larger-diameter float, but less than the height of the float, i.e. no more than 35 m, preferably lying in the range 20 m to 30 m. The longitudinal ends 5a of the separator bars 5 are fastened in the proximity of the top and bottom ends of said first and second floats 2, by rotary hinge devices 6 that are described below.

For each rigid pipe, the vertical riser has, at its bottom end, a terminal pipe portion that is preferably reinforced (not shown), being connected to the main portion of said vertical riser by a flexible joint 8a that allows said main portion of the riser to perform angular movements α relative to said terminal pipe portion. Said base 9-1, 9-2 supports a structure 8b rigidly holding said terminal pipe portion of said vertical riser in a vertical position, as described by way of example in patents WO 02/103153 and WO 02/066786.

Said first and second flexible pipes are of the type having two dipping catenaries (also known as "flexible jumpers").

Figure 5:
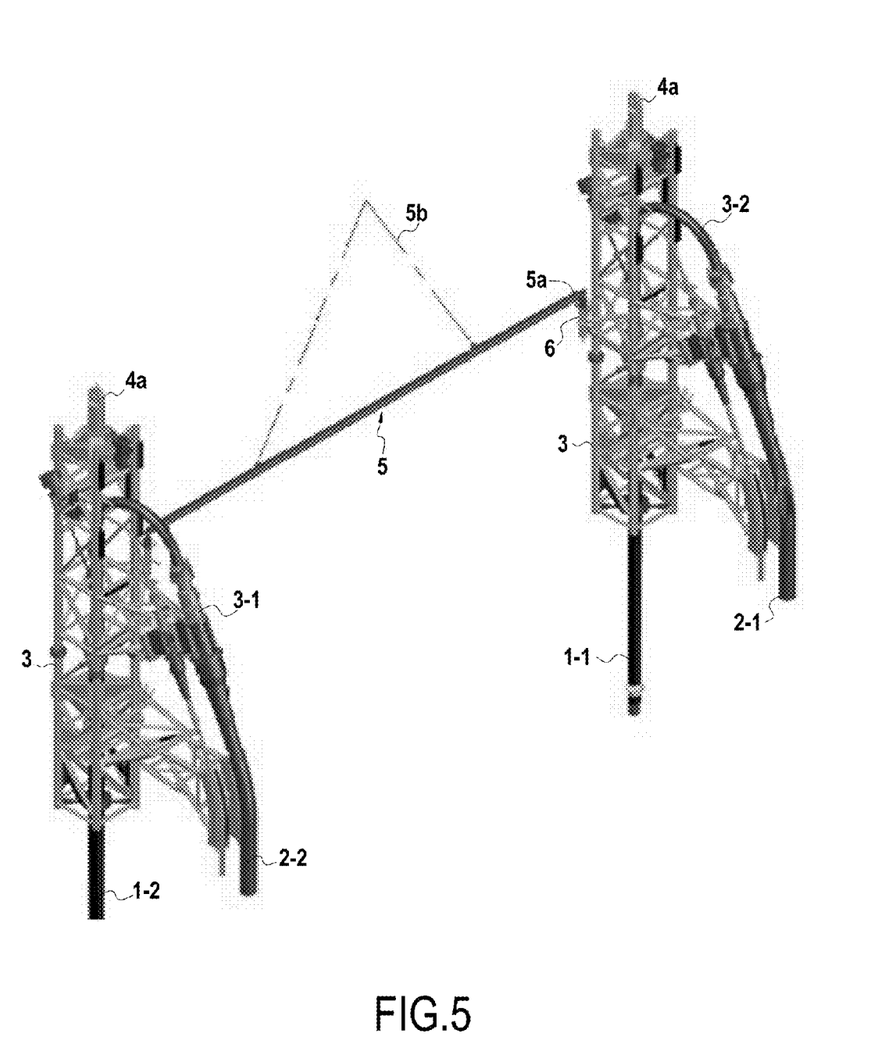
FIG. 5 is a view of an embodiment in which a separator bar 5 is mounted to the assembly structure 3 supporting the goose-neck type junction device 3-1, 3-2 between the flexible pipe and the rigid pipe.

Furthermore, insofar as the goose-neck type devices 3-1, 3-2 are relatively fragile, an assembly structure 3 is used at the assembly between the top end of the riser and the float and also at the junction between the top end 1b of the riser and the end of each flexible pipe, which assembly structure 3 is constituted by a latticework of beams (as shown in FIG. 5) serving to take up coupling forces in the assembly so as to reduce the load on the goose-neck type junction device.

The installation has connection devices 4a between said first and second floats and the top ends of said first and second risers, respectively, each comprising a portion of flexible pipe having its ends embedded respectively in the underface of said first or second float and the top end of said first or second vertical riser.

Figure 2:
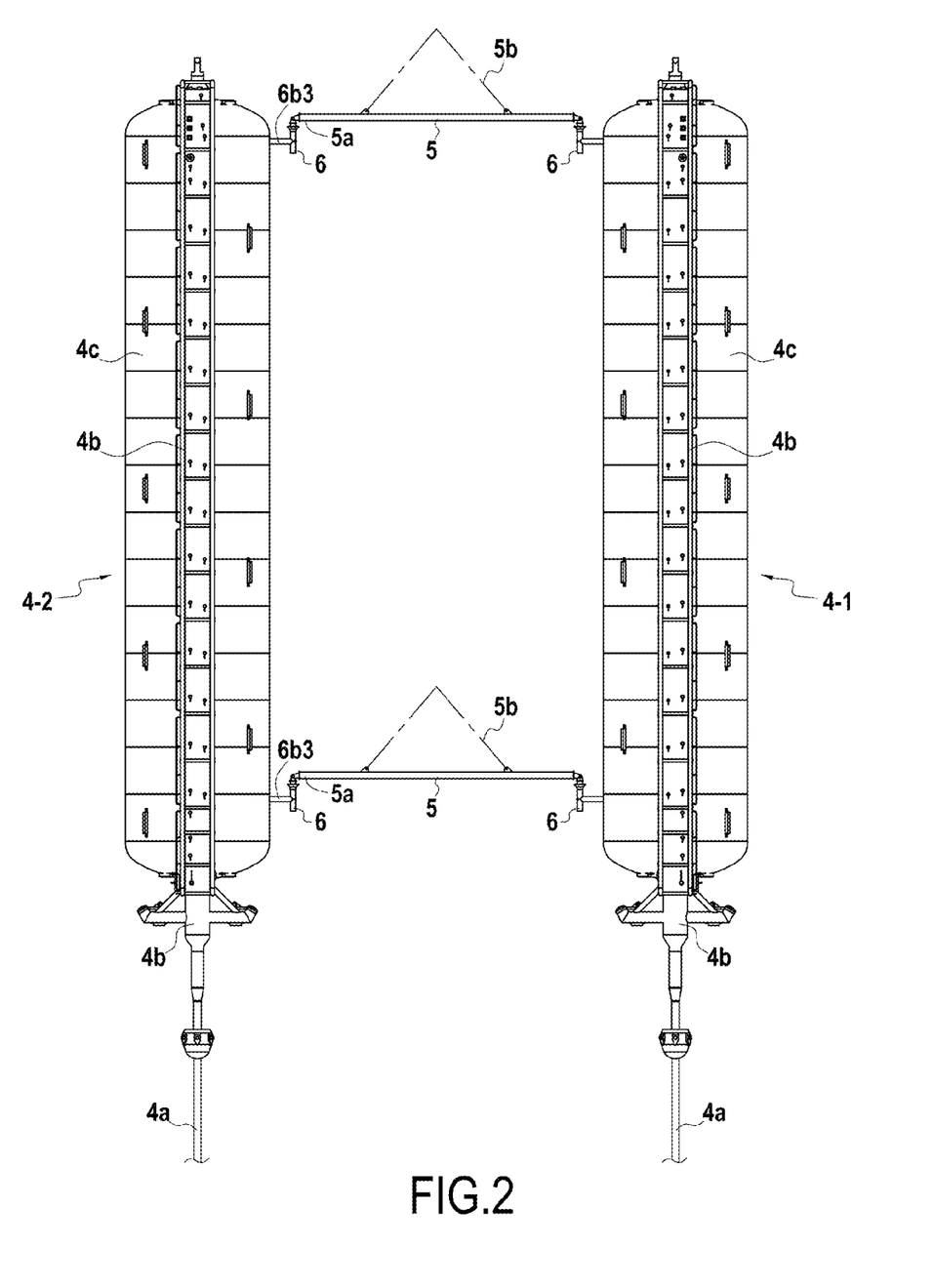
FIG. 2 is a side view of the two header floats connected together by two separator bars 5 as shown in FIG. 1.

Said flexible pipe portion 4a is extended through said first or second float by a rigid tubular pipe portion 4b passing right through the float, as shown in FIG. 2, so that it is possible to take action on the inside of said first or second vertical riser from the top portion of the float through said rigid tubular pipe portion, and then through said goose-neck shaped device, so as to access the inside of said riser and clean it by injecting liquid and/or by scraping the inside wall of said riser, and then access said undersea pipe resting on the sea bottom.

Said first and second floats and the tops of said first and second vertical risers are substantially at the same height above the sea bottom 10. The first and second floats are connected together by two rigid separator bars 5 of the same length arranged in parallel and substantially horizontally, perpendicularly to the axes ZZ' of said first and second floats and/or respectively the top ends 1b of said first and second risers, both bars being situated in the proximity of the top or bottom ends of said floats 4-1, 4-2 so as to be spaced apart by a height of at least one-fifth of the height of said floats, e.g. a distance of half the height of said floats.

Said first and second floats 4-1, 4-2 have a length in the range 20 m to 50 m and a diameter in the range 4 m to 8 m.

By way of example, the rigid separator bars 5 have a length in the range 10 m to 50 m, and preferably in the range 20 m to 35 m.

The separator bars 5 are connected to said floats by rotary fastener and hinge devices 6 having two degrees of freedom in rotation making possible: a) a first movement of said bar in rotation relative to an axis YY' perpendicular to the longitudinal axis XX' of said separator bar and perpendicular to the axis ZZ' of said float; and b) a second movement of said separator bar in rotation relative to the longitudinal axis ZZ' of said float, the second movement in rotation being advisable in order to reduce the forces on the structures.

FIG. 3 shows that the rigid bar 5 is a hollow bar with an empty inside space 5-2 that can be entirely filled with water since it opens out via its open longitudinal ends 5a. Advantageously, the bar 5 also has lateral perforations 5d in its cylindrical wall 5-1 making it easier to fill the hollow bar with water and to pass water due to currents in a direction extending in a transverse direction extending perpendicularly to the longitudinal direction of the bar.

Figure 3A:
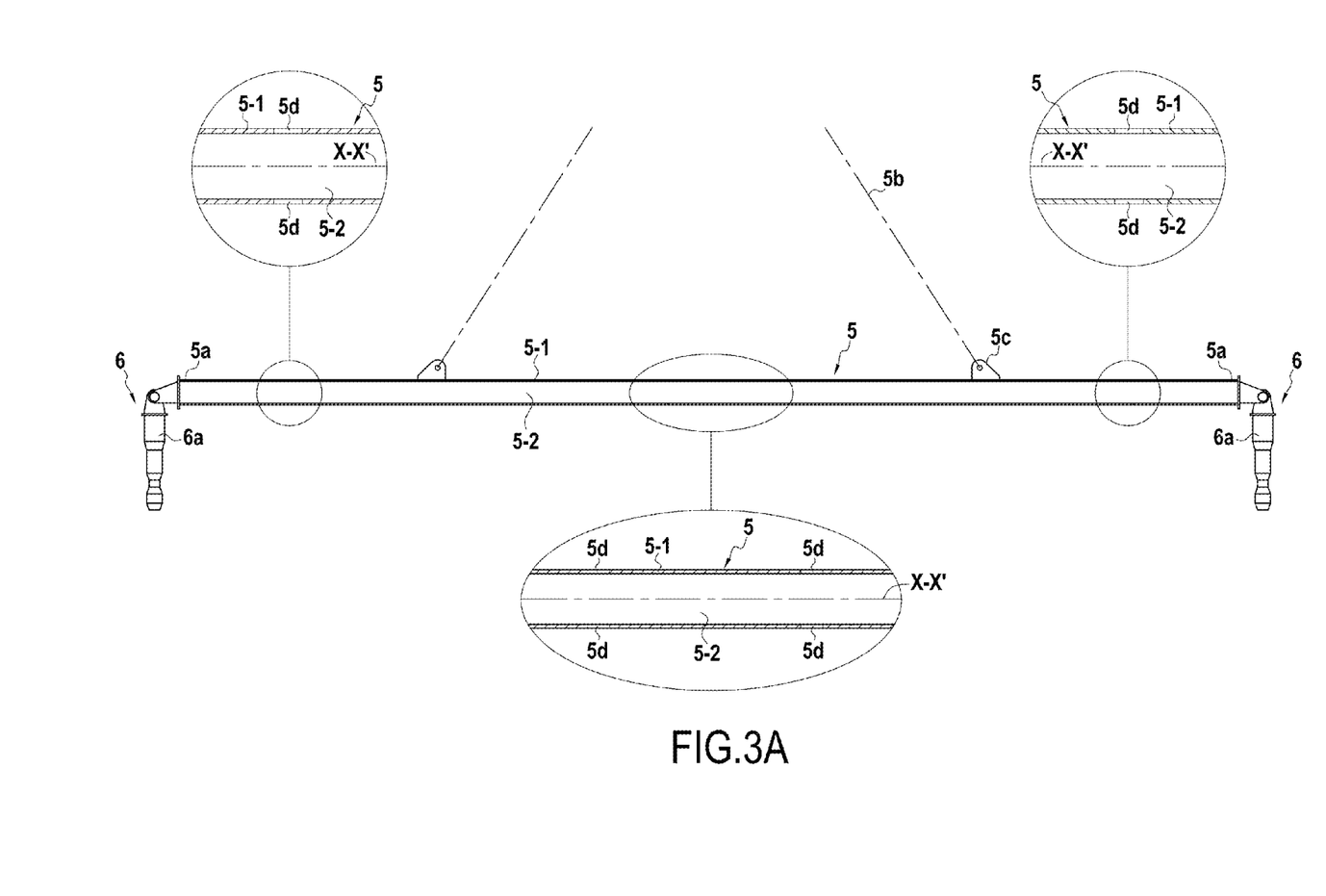
FIG. 3A is a longitudinal section view of the bar showing two fastener and hinge devices 6 respectively at each end, together with detail views showing perforations 5d in the cylindrical wall 5-1.
Figure 3B:
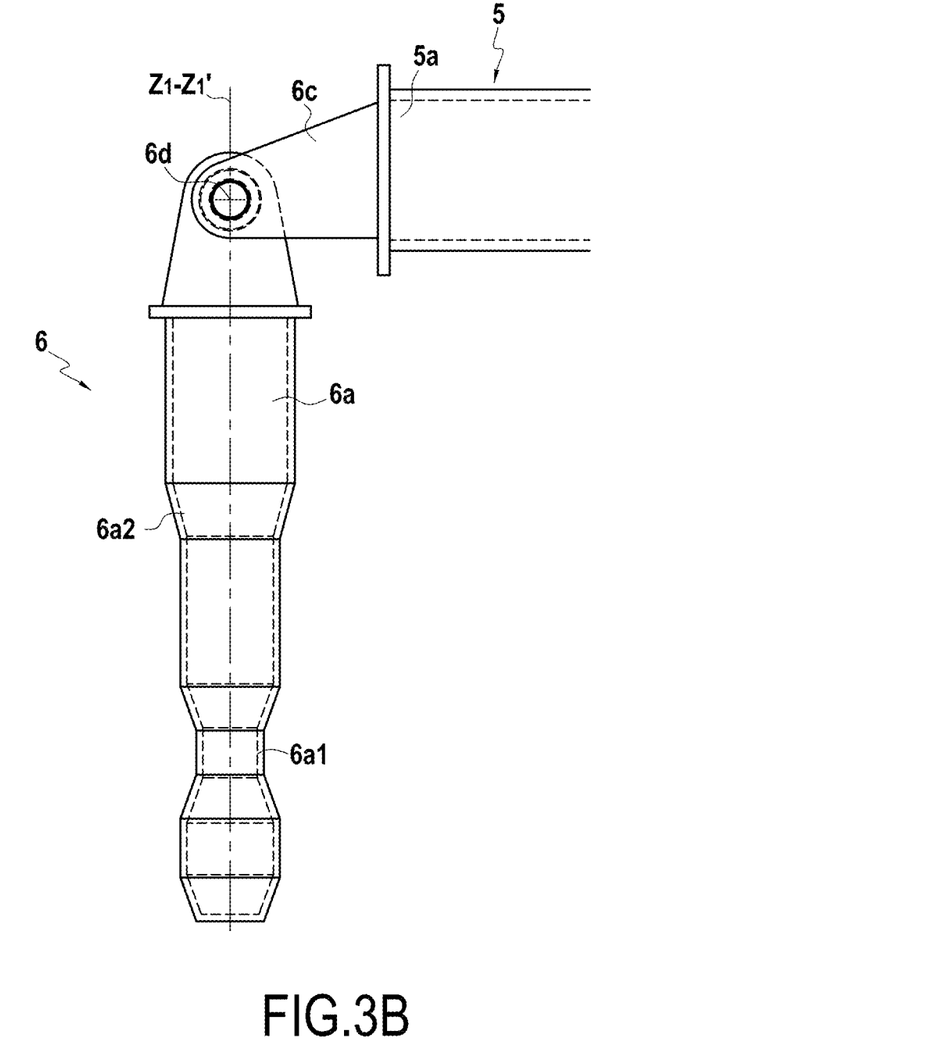
FIG. 3B is a detail view of the portion of the fastener and hinge device 6 that is secured to the end of the separator bar, as seen from the side.

Typically, the bar 5 presents a diameter lying in the range 1 centimeter (cm) to 30 cm.

In FIG. 2, the connection rod 6b3 for connecting the sleeve 6b with the float provides a connection between the sleeve 6b and the central rigid pipe portion 4b going through the float in its longitudinal direction. The connection rod 6b3 thus passes through the inside of the space of the float between the rigid pipe portion 4b and its peripheral cylindrical surface in its main portion 4c.

The separator bars 5 are fitted with respective handling cables 5b enabling them to be installed by hoisting and lowering devices from a laying vessel on the surface and also by using a remotely operated vehicle (ROV) so as to make it easier to insert the fingers 6a into the inside of the sleeves 6b.

The rotary fastener and hinge device 6 is shown in FIGS. 3A to 3D. A clevis 6c comprises two parallel plates 6c1, 6c2 arranged in respective XZ planes and fastened rigidly to one end of said separator bar at the open end of its cylindrical wall 5-1. Said plates 6c1, 6c2 support a transverse cylindrical rod 6d that extends between the two plates 6c1 and 6c2. Such a fastener and hinge device 6 has a first portion secured to the longitudinal end of said separator bar, said first portion comprising said finger 6a, and a second portion comprising said sleeve 6b that is secured to a said float or to an assembly structure 3 as described below. As shown in FIG. 3, each separator bar 5 comprises:

a said first portion at each of its two longitudinal ends 5a forming the axis YY' for said first movement in rotation arranged perpendicularly to the longitudinal axis XX' of said separator bar and perpendicularly to the axis ZZ' of said float; and a longitudinal element in the form of a finger 6a having its top end with said transverse cylindrical rod 6d passing therethrough forming the axis of said first movement in rotation and about which the finger 6a is mounted so as to be capable to move freely in rotation; and a sleeve 6b having its main portion in the form of a cylinder forming a sheath having a cylindrical orifice suitable for receiving the finger 6a and allowing said finger to turn about its longitudinal axis Z1-Z1' coinciding with the longitudinal axis of said cylindrical orifice of the sleeve, which is arranged parallel to the axis ZZ' of said float to which said sleeve is fastened via a rod 6b3. Said sleeve includes releasable retaining means 6b2 suitable for retaining the finger in the cylindrical orifice of said sleeve.

Figure 3C:
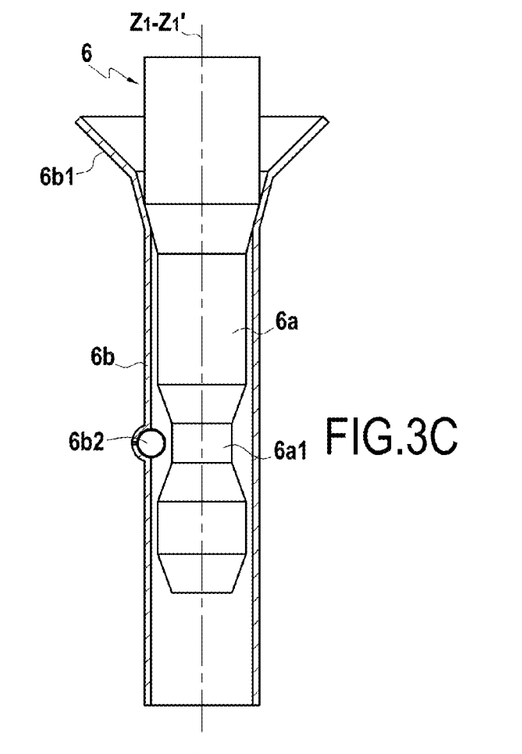
FIG. 3C is a section view showing the finger 6a of the fastener and hinge device 6 inserted in the sleeve or sheath 6b of the device fastened to the float.
Figure 3D:
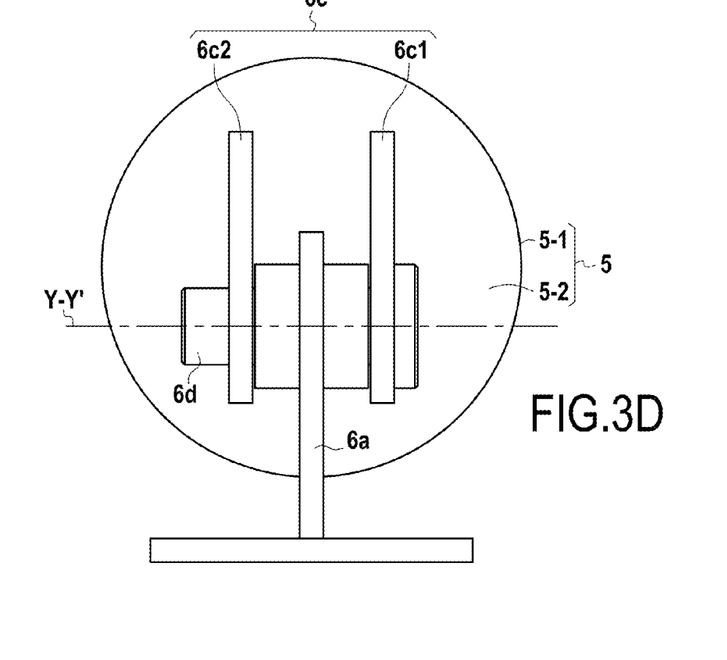
FIG. 3D is a section view of the fastener and hinge device in section perpendicularly relative to the longitudinal axis XX' of the bar at the junction between the separator bar and the device.

As shown in FIG. 3C, the sleeve 6b has a top end that is flared, forming a funnel 6b1, so as to facilitate inserting said finger into the inside of said sleeve. The finger 6a is of elongate shape defined by a surface of revolution about the axis Z1-Z1', including along its length a zone of diameter that is smaller than the diameter of its main portion so as to form a neck 6a1 suitable for co-operating with abutment or retaining means 6b2.

The retaining means 6b2 are disengaged or in a retracted position so as to release the inside space of the sheath 6b in order to enable the main portion of larger diameter of the finger 6a to be inserted inside the sheath 6b. Thereafter, once the finger 6a has been inserted inside the sheath 6b, the abutment or retaining means 6b2 are engaged or extended into the inside of the inside space of the sheath 6b at the level of the neck 6a1 in the finger in order to prevent the finger from sliding inside the sheath, thereby securing said first and second portions of the fastener and hinge device 6 to each other.

The positioning of the abutment means 6b2 facing the neck portion 6a1 of the finger is controlled by the fact that the top end of the finger has an outside surface 6a2 of frustoconical shape engaging the funnel 6b and suitable for being held by the funnel-shaped portion 6b1 at the top end of the sleeve 6b.

The retaining means 6b2 do not prevent the finger 6a1 from moving in rotation about its axis Z1-Z1' while it is inserted inside the sheath 6b in the retaining position. Co-operation between the finger 6a and the sleeve 6b thus makes possible said second movement in rotation of the separator bar in a horizontal plane.

Thus, in the event of an angular offset between the tops of the two risers while they are moving as a result of swell, waves, or undersea currents, or as a result of movements of the floating support 12, the separator bar 5 can move in rotation about said axis Z1-Z1', thereby avoiding bending moment forces, if any, being taken up by the clevis 6c.

Above all, this freedom of the separator bar to move in rotation relative to the longitudinal axis Z1-Z1' of the finger, and thus relative to the longitudinal axis ZZ' of said float also enables said float to move in rotation along the axis ZZ' as a result of the above-explained phenomenon.

Movement in rotation of the separator bar relative to the transverse cylindrical rod 6d allows a said first movement in rotation of said separator bar to take place in a vertical plane. Said first movement in rotation of the bar in a vertical plane increases with decreasing length of the bar.

This first movement in rotation is important since the largest movements of the tops of the risers and thus of the two respective floats are differences in height associated with swell or undersea currents or with movements of the floating support 12, or indeed with differential expansions between the two risers associated with the hot fluids they convey.

Figure 4:
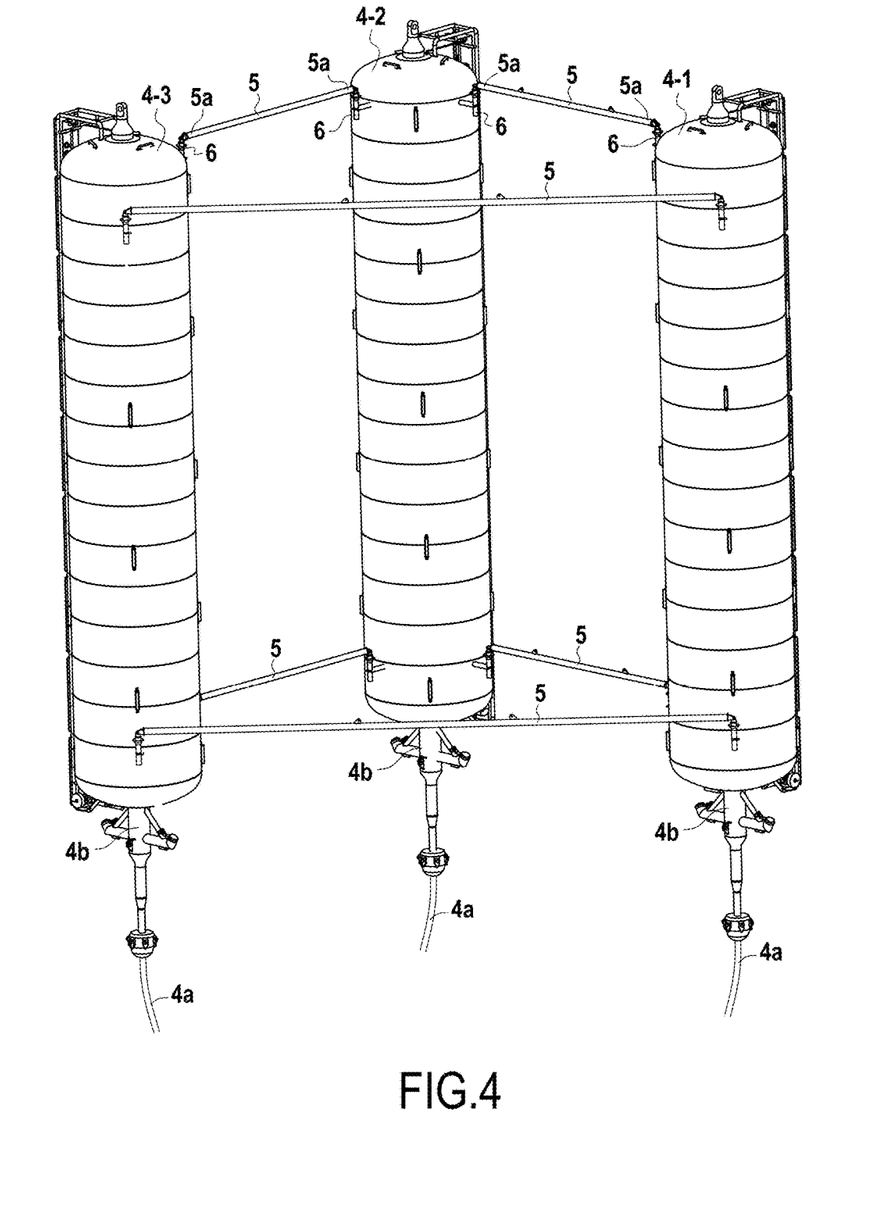
FIG. 4 is a view of an embodiment having three hybrid towers connected together by pairs of separator bars interconnecting their respective floats.

FIG. 4 shows an embodiment F in which three hybrid towers are connected together via their header floats, i.e. said first float 4-1 and said second float 4-2 are likewise connected via two separator bars 5 to a third float 4-3 at the top of the third riser 1-3 connected to a third flexible pipe 2-3 via a third goose-neck type junction device 3-3. Thus, each of the three floats is connected to the other two floats by two separator bars 5.

In an embodiment that is not shown, each of the floats may be also be connected to an additional header float of an additional hybrid tower arranged in the center of the geometrical figure in section in a horizontal plane, in particular of the polygon, which may more particularly be a square, and four peripheral floats arranged in a square are placed around a central float, each peripheral float being connected to the three nearest other floats and the central float being connected to all four peripheral floats.

FIG. 5 shows an assembly structure constituted by latticework beams 3a supporting the goose-neck devices 3a and taking up coupling forces between the vertical riser and the flexible pipe and also between the junction device 3 and the float. Advantageously, the connection bars are coupled to the float with at least one additional connection bar being level with said assembly structure 3a at the top of each of said vertical risers 1-1, 1-2.

The invention claimed is:

1. An installation of bottom-to-surface connections for at least two undersea pipes (11-1, 11-2) resting on the sea bottom (10), the installation comprising at least two hybrid towers, each comprising:
   a) a rigid pipe (1-1, 1-2) constituting a vertical riser having its bottom end (1a) fastened to a base (9-1, 9-2) resting on or anchored to the sea bottom (10), each rigid pipe being connected to a respective undersea pipe (11-1, 11-2) resting on the sea bottom, and having the top end (1b) of the riser tensioned in substantially vertical manner by a float (4-1, 4-2) immersed in the subsurface, the top end being connected to the float; and
   b) a flexible connection pipe (2-1, 2-2) providing the connection between a floating support (12) and the top end (1b) of said vertical riser via a junction device (3-1, 3-2) arranged at the top end (1b) of said vertical riser;
   wherein said two hybrid towers are connected together by at least one rigid separator bar (5) having a length larger than the diameter of the larger-diameter float, the longitudinal ends (5a) of each said separator bar (5) being fastened to the top ends (1b) of said risers or to said two floats by fastener devices comprising a rotary fastener and a hinge device (6), said fastener devices allowing at least two degrees of freedom for movement in rotation of said bar relative to an axis (YY') perpendicular to the longitudinal axis (XX') of said separator bar and perpendicular to the axis (ZZ') of said float or of said top end of the riser to which it is fastened, wherein said rotation allows said separator bar (5) to perform (a) a first movement in rotation, and (b) a second movement in rotation relative to the longitudinal axis (ZZ') of said float or of said riser end to which it is fastened, and
   wherein said rotary fastener and hinge device (6) comprise:
      a clevis (6c) rigidly fastened to one end of said separator bar, which clevis supports a transverse cylindrical rod (6d) forming the axis (YY') for said first movement in rotation arranged perpendicularly to the longitudinal axis (XX') of said separator bar and perpendicularly to the axis (ZZ') of said float or of said riser top end to which said separator bar is fastened;
      a longitudinal element in the form of a finger (6a) having its top end with said transverse cylindrical rod (6d) passing therethrough forming the axis for said first movement in rotation and about which said finger (6a) is mounted so as to be free to move in rotation; and
      a sleeve forming a sheath (6b) having a cylindrical orifice adapted to receive said finger and allowing said finger to move in rotation about its longitudinal axis coinciding with the longitudinal axis of said cylindrical orifice in the sleeve arranged parallel to the axis (ZZ') of said float or of said riser top end to which said sleeve is fastened, said sleeve including removable retaining means (6b2) suitable for retaining said finger in said cylindrical orifice of said sleeve.

2. The bottom-to-surface connection installation according to claim 1, wherein said floats (4-1, 4-2) or said top ends (1a) of said vertical risers (1-1, 1-2) are connected together by a plurality of rigid separator bars (5) of the same length arranged in parallel.

3. The bottom-to-surface connection installation according to claim 1, wherein said separator bar is a hollow rod perforated (5-2) in its longitudinal direction over its entire length opening out at its longitudinal ends, and also including transverse perforations (5d) allowing water to pass in a direction perpendicular to its longitudinal direction.

4. The bottom-to-surface connection installation according to claim 1, wherein said longitudinal ends (5a) of said separator bar are fastened to the cylindrical outside walls of said floats.

5. The bottom-to-surface connection installation according to claim 4, wherein said separator bars (5) are fastened in hinged manner to said floats (4-1, 4-2) and other said separator bars (5) are fastened in hinged manner to said assembly structures (3).

6. The bottom-to-surface connection installation according to claim 1, wherein the longitudinal ends (5a) of said separator bar are fastened to an assembly structure (3) supporting a junction device (3-1, 3-2) arranged at the top end (1b) of said vertical riser (1-1, 1-2) and providing its junction with said flexible connection pipe (2-1, 2-2), said assembly structure being constituted by a latticework of beams (3).

7. The bottom-to-surface connection installation according to claim 6, wherein said separator bars (5) are fastened in hinged manner to said floats (4-1, 4-2) and wherein other said separator bars (5) are fastened in hinged manner to said assembly structures (3).

8. The bottom-to-surface connection installation according to claim 1, wherein said floats (4-1, 4-2) and/or said the top ends (1b) of said vertical risers (1-1, 1-2) are substantially at the same height above the sea bottom and are connected together by at least two rigid separator bars (5) of the same length arranged in parallel and perpendicularly to the axes of said floats and/or of the top ends of said risers, said two separator bars being spaced apart by a height of at least one-fifth of the height of said floats and/or of an assembly structure (3) at said top ends (1b) of said vertical risers, said assembly structure (3) supporting junction devices (3-1, 3-2) arranged at the top ends (1*b*) of said vertical risers and providing its junction with said flexible connection pipes.

9. The bottom-to-surface connection installation according to claim 1, further comprising more than two hybrid towers and thus more than two said vertical risers (1-1, 1-2, 1-3), and in particular 2 to 50 risers, the top ends or the floats of each of the vertical risers of each tower being connected to at least two other riser top ends or two other riser floats that are the closest thereto, the flexible connection pipes (2-1, 2-2, 2-3) being connected to a common floating support.

10. The bottom-to-surface connection installation according to claim 1, wherein at least one of said hybrid towers has a rigid pipe in the form of two coaxial pipes of the pipe-in-pipe (PIP) type.

11. The bottom-to-surface connection installation according to claim 1, wherein each hybrid tower comprises a connection device (4*a*) between said float and the top end of said riser (1*b*) and comprising:

a flexible pipe portion having its ends embedded respectively in the underface of said float and the top end of said vertical riser;

the connection of said flexible pipe portion (4*a*) to the top end of said riser taking place via a goose-neck shaped device (3-1, 3-2), which goose-neck shaped device also provides the connection of said riser (1-1, 1-2) and of a said flexible connection pipe (2-1, 2-2) with the floating support; and said flexible pipe portion (4*a*) preferably being extended through said float by a rigid tubular pipe portion (4*b*) passing right through the float so that it is possible to take action inside said vertical riser from the top portion of said float through said rigid tubular pipe portion (4*b*), then through said goose-neck shaped device (3-1, 3-2, 3-3), so as to access the inside of said riser, and then access said undersea pipe (11-1, 11-2) resting on the sea bottom (10).

12. The bottom-to-surface connection installation according claim 1, wherein the connection between the bottom end (la) of said vertical riser (1-1, 1-2) and a said undersea pipe (11-1, 11-2) resting on the sea bottom (10) takes place via a flexible joint hinge (8*a*) that allows the riser to perform angular movements (a).

13. The bottom-to-surface connection installation according to claim 12, wherein said riser includes at its bottom end (la) a terminal pipe portion that is connected to the main portion of the riser by a said flexible joint hinge (8*a*) that allows said angular movements of the main portion of the riser relative to said terminal pipe portion, and said base (9-1, 9-2) rigidly holding said terminal pipe portion (5-1) of said vertical riser in a fixed vertical position by means of a structure (8*b*) that is secured to said base (9-1, 9-2).

14. The bottom-to-surface connection installation according to claim 1, wherein the length of the separator bar is at least three times the diameter of the larger-diameter float but less than the height of the float.

15. A method of laying at sea a bottom-to-surface connection installation according to claim 1, wherein following steps are carried out:

1) assembling from a laying vessel (14) on the surface (13) a first vertical riser (1-1) that is lowered and anchored to the sea bottom at a first base (9-1) and that is tensioned at its head by a first float (4-1) immersed in the subsurface, and connecting the bottom end of said riser to the end of a said first undersea pipe (11-1) resting on the sea bottom (10); and 2) assembling from the laying vessel (14) on the surface (13) a second rigid pipe (1-2) that is tensioned at its head by a second float (4-2) immersed in the subsurface, and connecting the bottom end of said second riser to the end of a said second undersea pipe (11-2) resting on the sea bottom; and 3) connecting together said first and second floats or the tops of said first and second risers by means of said separator bars (5) lowered by cables (5*b*) from the laying vessel and fastening the longitudinal ends of said separator bars (5) by means of said fastener and hinge devices (6) by using a remotely operated vehicle (ROV), to said floats and/or said assembly structures (3) supporting said junction devices (3-1, 3-2) at the top ends (1*b*) of said risers; and 4) laying first and second flexible connection pipes (4*a*, 4*b*) between the top ends (1*b*) of said first and second rigid pipes and a common floating support (12).

\* \* \* \* \*